(12) United States Patent
Britton et al.

(10) Patent No.: US 7,673,849 B2
(45) Date of Patent: Mar. 9, 2010

(54) UNIBODY HYDRAULIC NUT

(75) Inventors: Gordon Britton, Grand Bend (CA); David Hughes, Grand Bend (CA)

(73) Assignee: Integra Technologies Limited, Grand Bend, Ontario (CA)

(*) Notice: Subject to any disclaimer, the term of this patent is extended or adjusted under 35 U.S.C. 154(b) by 25 days.

(21) Appl. No.: 11/346,374

(22) Filed: Feb. 3, 2006

(65) Prior Publication Data

US 2007/0181861 A1     Aug. 9, 2007

(51) Int. Cl.
*E04G 21/12* (2006.01)

(52) U.S. Cl. .................................. 254/29 A

(58) Field of Classification Search ........... 254/29 A, 254/89 H, 93 R; 81/57.38; 411/280
See application file for complete search history.

(56) References Cited

U.S. PATENT DOCUMENTS

| | | | | |
|---|---|---|---|---|
| 3,199,564 A | * | 8/1965 | Waeltz | 411/280 |
| 3,287,999 A | * | 11/1966 | Kreckel et al. | 81/57.36 |
| 4,182,215 A |   | 1/1980 | Green et al. | |
| 4,224,843 A | * | 9/1980 | Heiermann et al. | 81/57.38 |
| 4,249,718 A |   | 2/1981 | Heaton | |
| 4,773,146 A |   | 9/1988 | Bunyan | |
| 5,046,906 A |   | 9/1991 | Bucknell | |
| 5,330,159 A | * | 7/1994 | Heiermann | 254/29 A |
| 5,527,015 A | * | 6/1996 | Percival-Smith | 254/29 A |
| 6,065,737 A |   | 5/2000 | Richardson et al. | |
| 2007/0181861 A1 | * | 8/2007 | Britton et al. | 254/29 A |

FOREIGN PATENT DOCUMENTS

CA     2496933     8/2005

OTHER PUBLICATIONS www.hydratight.com/english.information.114.html.
www.hydratight.com/english.information.322.html.
www.hydratight.com/english.information.213.html.

* cited by examiner

*Primary Examiner*—Lee D Wilson
(74) *Attorney, Agent, or Firm*—Brouillette & Partners LLP

(57) ABSTRACT

A unibody hydraulic nut for tensioning multiple threaded fasteners includes an unibody containing two or more pistons to generate a clamping load, castellated locking collars with angled vertical castellations to engage a socket with matching castellations to enable easy turning by remotely operated means to capture the clamping load, internal hydraulic ports contained within the unibody linking each piston, seals to maintain the hydraulic pressure within the multiple annular pressure areas and an external hydraulic pressure port extending through the hydraulic nut unibody to the first pressure area and adapted to be connected to an external pressure source.

17 Claims, 21 Drawing Sheets

UNIBODY HYDRAULIC NUT

CROSS-REFERENCE TO RELATED APPLICATIONS

There are no cross-related applications.

FIELD OF THE INVENTION

The present invention relates to a hydraulic nut assembly. More specifically, the present invention is concerned with two or more hydraulic nuts that are contained within a common body to provide a load to two or more studs or bolts in an assembly.

BACKGROUND OF THE INVENTION

Hydraulic nuts are well known and have been used throughout the industry for many decades. Prior art includes individual nuts that are made up of an inner body that is threaded on to the stud to be tightened, an outer body that acts as a piston to generate an axial tension load to clamp the work pieces being joined and a locking collar to mechanically maintain the axial load generated by the hydraulic pressure in the annular piston created between the inner and outer bodies. The gap between the inner and outer bodies needs to be sealed so that hydraulic pressure is generated. This is achieved by a built-in added sealing device.

When multiple studs in a work piece are required to be tensioned, an individual hydraulic nut is installed on to each fastener. Each nut is then linked together by an external hydraulic hose or rigid tubing to allow a common hydraulic pressure to be transmitted to each nut to generate uniform clamp load.

Generally, the outside diameter of the hydraulic nut is fixed, based on the stud diameter, the hydraulic pressure area, and the cylinder wall thickness to contain the hydraulic pressure. On certain flange assemblies with close bolt pitch, hydraulic nuts cannot be used as this diameter will not allow the hydraulic nut to be fitted without interference with adjacent hydraulic nuts.

Other methods of tensioning groups of studs include using external tensioners. A hydraulic bolt tensioning device consists of a reaction component which is threaded on to a stud and bears against a hydraulic head containing a piston. An aperture at the bottom of the tensioning head provides access to a traditional nut which is turned manually whilst the hydraulic head is under its operating pressure. A tensioner is installed on each stud in the assembly to be tightened. Each tensioner is connected through an external hydraulic hose or rigid tube assembly. Once all studs are suitably tensioned, these tools are removed from the flange assembly to be reused on another connection.

Multi-stud tensioners are used to group individual tensioners into a common segment (see for example the multi-stud tensioners manufactured by Hydratight Sweeney). Multiple tensioning segments are hydraulically connected using an external hose to allow a common load to be applied to each stud in the assembly. An aperture at the bottom of the tensioning segment provides access to a traditional nut which is turned manually, whilst the tensioning segment is under its operating pressure. Once all the studs in the assembly are suitably tensioned the multi-stud tensioning segments are removed from the flange assembly to be used on another connection.

The make up of critical connections such as steam generator manway covers often use external multi-stud segmented tensioners. These covers are installed with traditional studs and nuts. Then multi-stud tensioning segments are lifted into place to tighten the bolts. In the field of nuclear reactors, this slow process will cause additional manrem exposure to field personnel.

The make up of other critical connections such as steam turbines, reactor vessel manways and other flange connections that have tight pitch distances between assembly bolts can prohibit use of hydraulic nuts or external tightening tools such as tensioners.

These tensioning devices are not suitable in applications where assembly times measured in hours and minutes are cost prohibitive.

Also, the makeup of subsea flange assemblies is critical to ensure leak free connections and is a very time consuming process when using the above prior art. Moreover, in deep water flange assemblies, the use of Remote Operated Vehicles (ROV) is common. Traditional hydraulic nuts and tensioners are not generally suitable for use by ROV.

There is therefore a need for a unibody hydraulic nut which obviates the aforementioned problems.

OBJECTS OF THE INVENTION

The aim of this invention is to broaden the use of hydraulic nuts to be readily used along with sub-sea (ROV) and to broaden the applications where traditional hydraulic nuts will not fit due to small pitch spacing between studs and where additional time savings during flange assembly and disassembly are required.

Accordingly, an object of this invention is to improve the speed of assembly of bolted connections in underwater and other hazardous environments.

Another object of the invention is to provide a reliable, leak-free connection by providing a uniform and controlled compression on the seal.

An additional object of this invention is to significantly speed up the assembly and disassembly process of bolted assemblies by requiring only a quick hydraulic connection and pressurization and eliminating the slow process of torquing, tensioning and heavy wrenching of nuts with a simple turn of a mechanical locking collar using a castellated socket or a small hand-held bar.

A further object of this invention is to significantly reduce the space envelope around the bolted assembly to enable use of simultaneous tensioning processes in areas of constricted access, such as steam turbine casings, with a unibody hydraulic nut system built into the casing flange matingly connected to inner body and locking collar, that requires only an easily accessible hydraulic hose connection and the turning of the locking collars by hand or other external means.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

To attain these and other objects which will become more apparent as the description proceeds according to one aspect of the present invention, there is provided a unibody hydraulic nut.

More specifically, in accordance with the present invention, there is provided a hydraulic nut (FIGS. 1 and 2) for tensioning an assembly comprising an inner body (10), an outer body (11) matingly connected to two or more inner bodies, a locking collar (12) threaded on to each inner body, each locking collar being preferably located adjacent to the outer body and having a castellated (a series of protuberances, each two protuberances being separated by a recess) upper portion to mate with a turning socket, sealing means (13, 14) located between the inner and outer body, an annular pressure area (15) defined between each inner body and the outer body, an internal hydraulic pressure port connecting between each pressure area defined (16) in the outer body. The unibody hydraulic nut also includes an external pressure port (17) extending through the hydraulic nut to the first pressure area (15) and adapted to be connected to an external hydraulic pressure source. The sealing means (13, 14) can be of a variety standard elastomeric seals common in low temperature applications or of metal construction common in higher temperature or high pressure applications.

The unibody design of hydraulic nut (FIG. 3) combines 2 or more inner bodies (10) and mating studs (20) that are preferably simultaneously tensioned. The unibody construction reduces assembly times of bolted assemblies as it eliminates individual outer bodies and allows for thinner outer wall thickness as adjacent nuts share the same outer wall. This enables the use of hydraulic nuts in applications where there is a small pitch distance between each stud. The internal pressure port (16) connecting between each pressure area speeds up assembly by eliminating manual external connections found on individual hydraulic nuts. The unibody hydraulic nut is installed and bears (21) against the flange assembly, becoming part of the flange assembly.

There is also provided a unibody design of hydraulic nut (FIGS. 4 and 5) for tensioning an assembly comprising an inner body (10), an outer body (11) matingly connected to two or more inner bodies, a locking collar (12) mounted on each inner body and located adjacent to the outer body and having a preferably castellated upper portion to mate with the turning socket. The castellations (FIGS. 11 and 11a) are tapered (30), providing a wider gap at the top and a narrower gap at the bottom for mating with a turning socket (31) with a corresponding taper. The tapered castellations (FIG. 11a) allow for easy insertion and mating of the turning socket to the locking collar. The unibody hydraulic nut further comprises sealing means (13, 14) located between each inner body and the outer body, an annular pressure area (15) defined between each inner body and the outer body, an internal hydraulic pressure port (16) fluidly connecting each consecutive pressure area defined in the outer body and an external pressure port (17) extending through the hydraulic nut to the first pressure area, connecting to an external hydraulic pressure source. The sealing means (13, 14) can be of a variety standard elastomeric seals common in low temperature applications or of metal construction common in higher temperature or high pressure applications.

There is also provided a unibody design of hydraulic nut for tensioning an assembly (FIGS. 19 and 20) comprising an inner body (10), an outer body (11), matingly connected to two or more inner bodies and being an integral part of the assembly flange, such as steam casing, vessel cover, or other application flange. The unibody hydraulic nut further comprises a locking collar (12) mounted on each inner body, preferably located adjacent to the outer body and having a castellated upper portion to mate with a turning socket, sealing means located between each of the inner bodies and outer body, an annular pressure area defined between each of the inner bodies and the outer body, an internal hydraulic pressure port connecting between each pressure area defined in the outer body and a pressure port extending through the hydraulic nut to the first pressure area, connecting to an external pressure pumping source replacing the external unibody that mates against the flange. The sealing means (13, 14) can be of a variety standard elastomeric seals common in low temperature applications or of metal construction common in higher temperature or high pressure applications.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

DETAILED DESCRIPTION OF THE PREFERRED EMBODIMENT

Figure 1:
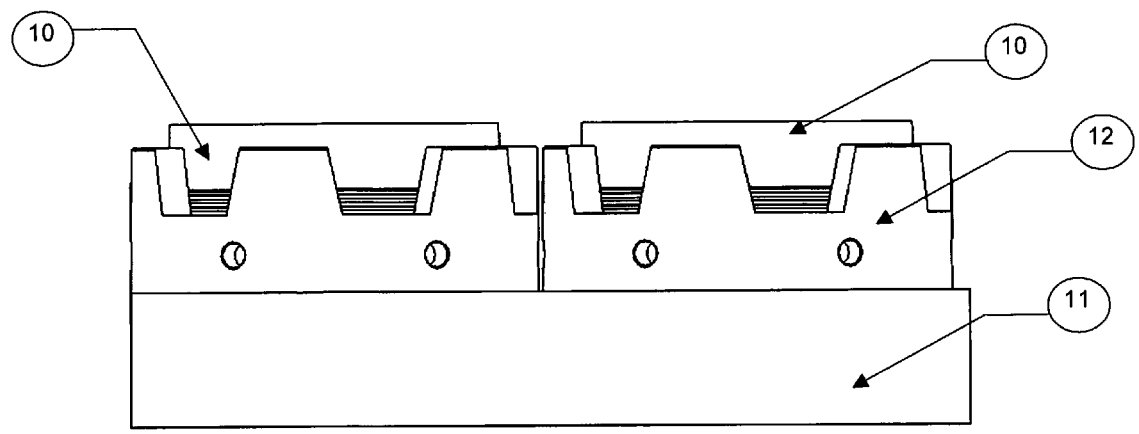
FIG. 1 is a side elevation view showing unibody hydraulic nut assembly according to the embodiment of the present invention.

With reference to the annexed figures, the preferred embodiments of the present invention will be herein described for indicative purposes and by no means as of limitations.

The figures and description attached to it are only intended to illustrate the idea of the invention. As to the details, the invention may vary within the scope of the claims. So, the size and shape of the unibody hydraulic nut may be chosen to best fit the flanges to connect.

Also, as used hereinabove and hereinafter, the term "stud" generally refers to stud, bolt, rod and other similarly shaped fasteners used in securing flanges assembly.

In accordance with the present invention, there is provided a hydraulic nut (FIGS. 1 to 6) for tensioning an assembly comprising an inner body (10), an outer body (11) matingly connected to two or more inner bodies, a locking collar (12) threaded on to each inner body (10), each locking collar (13) being preferably located adjacent to the outer body (11) and having a castellated upper portion (12) to mate with turning socket (31), sealing means (13) and (14) located between the inner and outer body in annular grooves (18) and (19) (see FIG. 3), an annular pressure area (15) defined between each inner body (10) and the outer body (11), an internal hydraulic pressure port (16) fluidly connecting each consecutive pressure area (15) defined in the outer body (11). The unibody hydraulic nut also includes an external pressure port (17) extending through the outer body (11) of the hydraulic nut to the first pressure area (15) and adapted to be connected to an external hydraulic pressure source.

The skilled addressee will readily understand that depending on the use and final location of the unibody hydraulic nut, different types of seals (13) and (14) could be used. Elastomeric, elastic, metallic and/or non-metallic seals are all contemplated. Moreover, ring seals, C-shaped seals, U-shaped seals and seals of other shapes are also contemplated.

Figure 7:
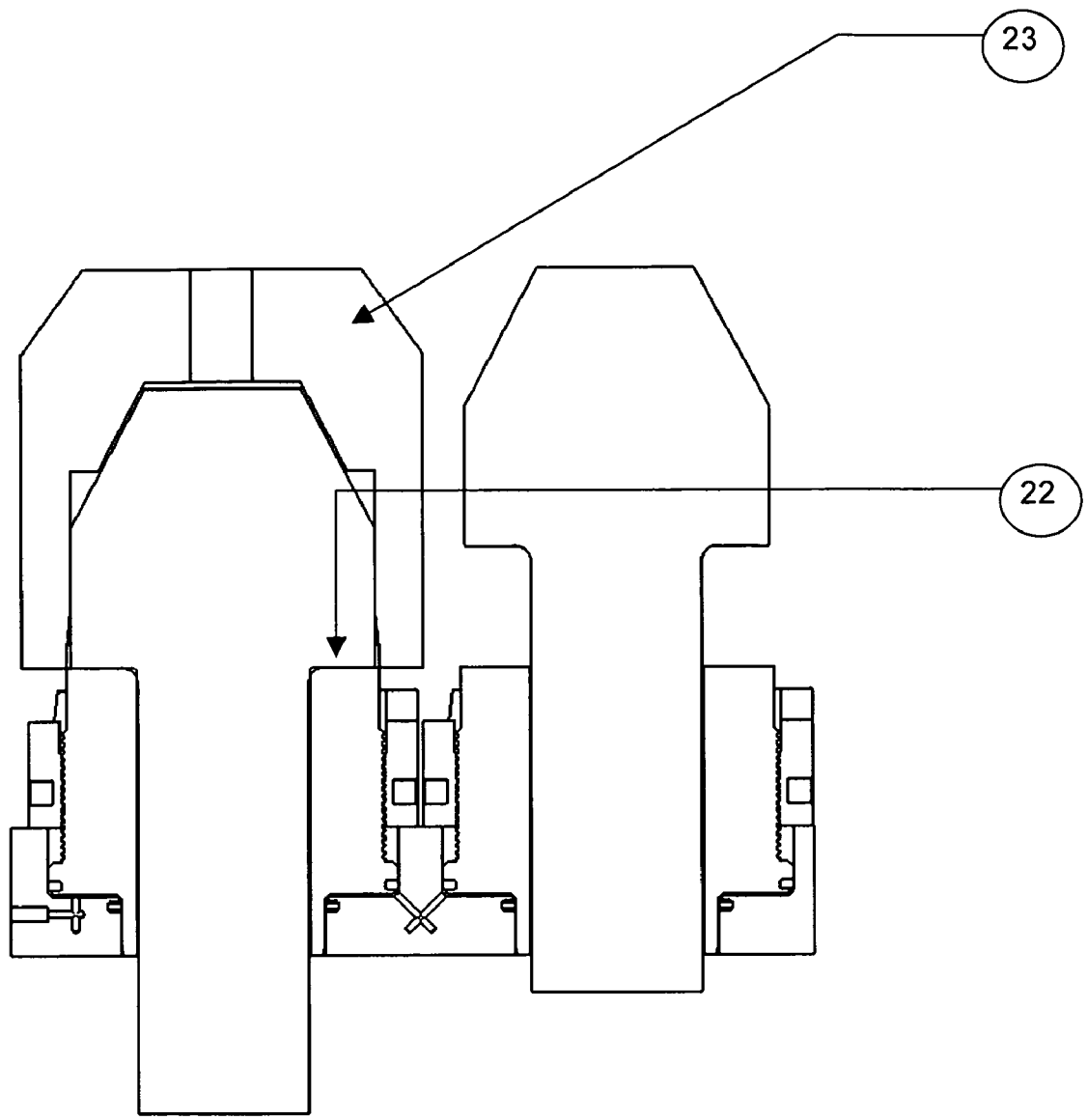
FIG. 7 is a full section view of FIG. 6.
Figure 8:
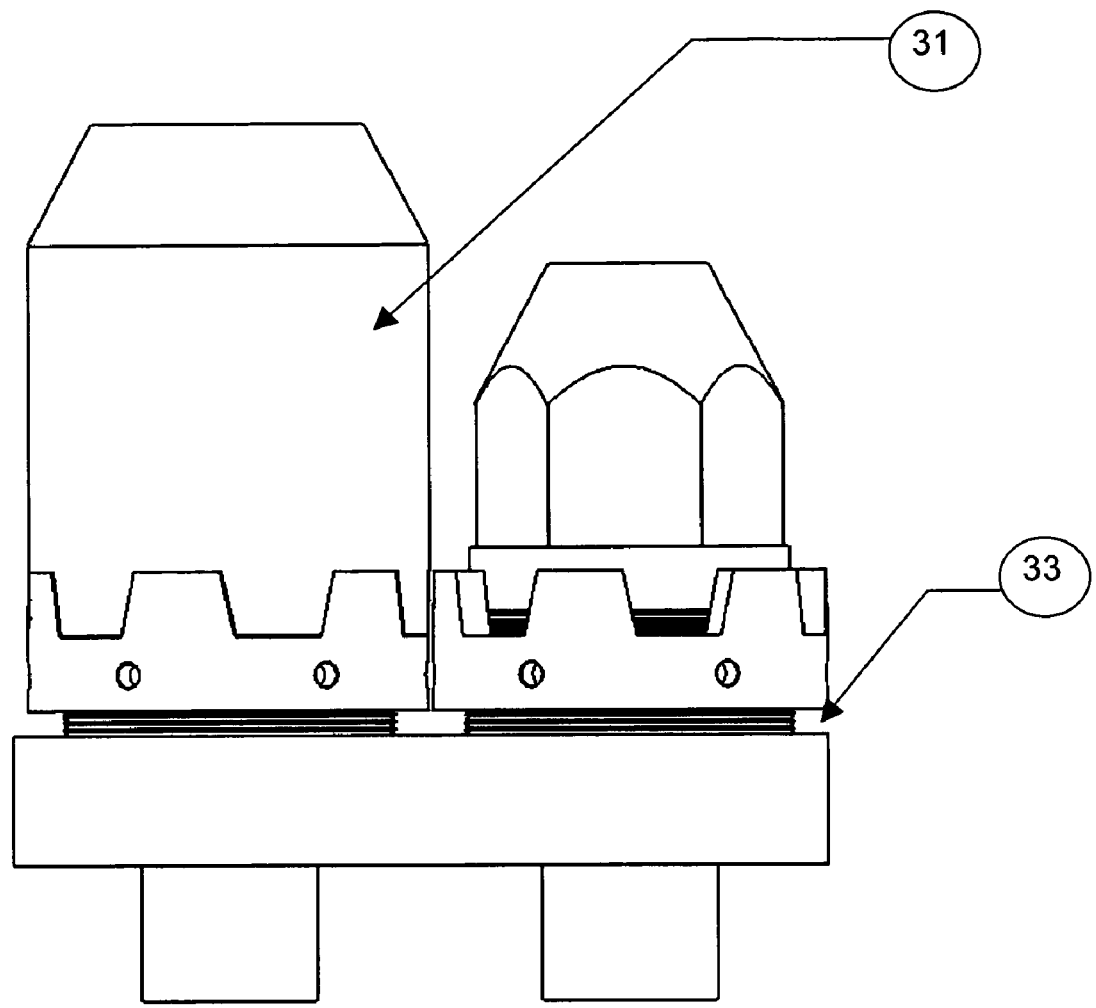
FIG. 8 is a side view of unibody hydraulic nut with hydraulic pressure applied and the castellated locking collar lifting off the mating surface of the outer body.

A first embodiment of the present invention is best shown in FIGS. 3 to 6. Its components consist of an outer unibody (11) that mates (surface 21) up against a flange assembly (see element 40 in FIG. 15 and element 41 in FIG. 17). A stud (20) or bolt with nut, is inserted through the inner body (10) and corresponding flanges that are mating together. The stud (20) can be threaded into the mating flange or to a mating flange that has a through hole and wherein the stud (20) threads into a standard nut on the mating flange. The stud bolt (20) can have an integral hex head (see FIG. 4) to allow it to be turned into place using external means, such as a hex socket (23) (best shown in FIGS. 7 and 8).

Figure 9:
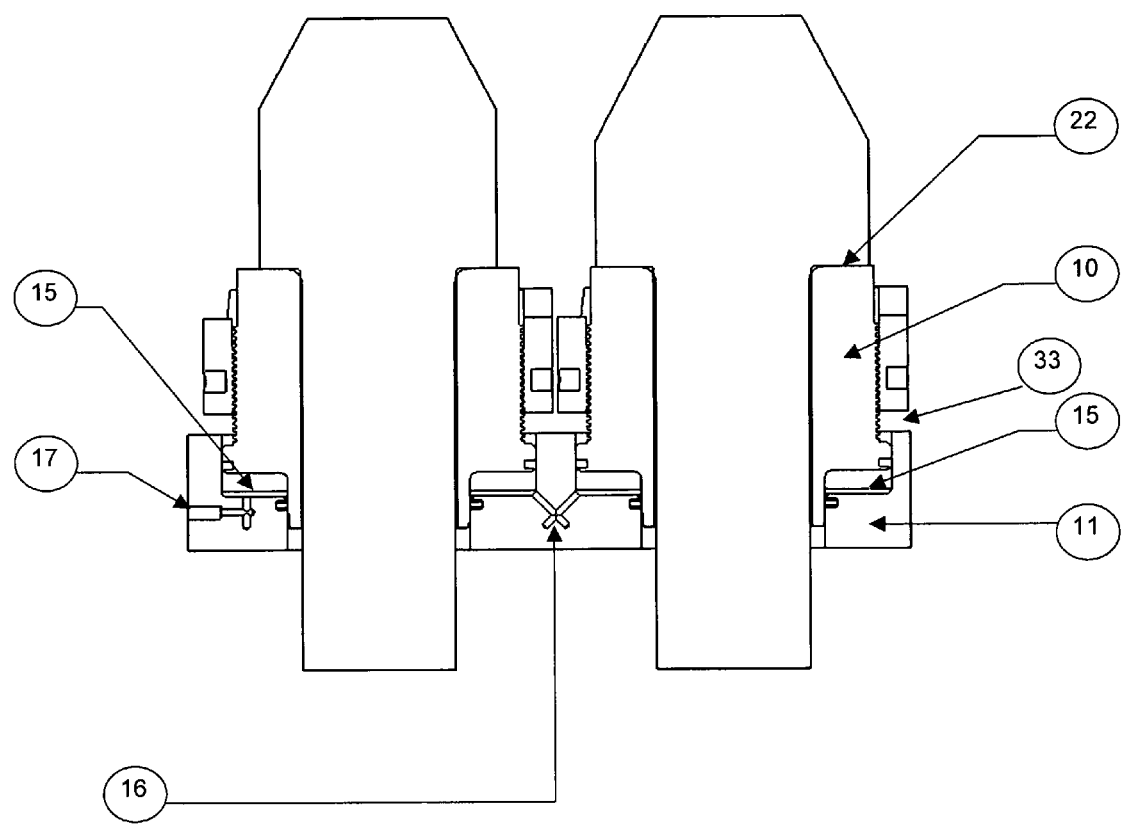
FIG. 9 is a full section view of FIG. 8.
Figure 10:
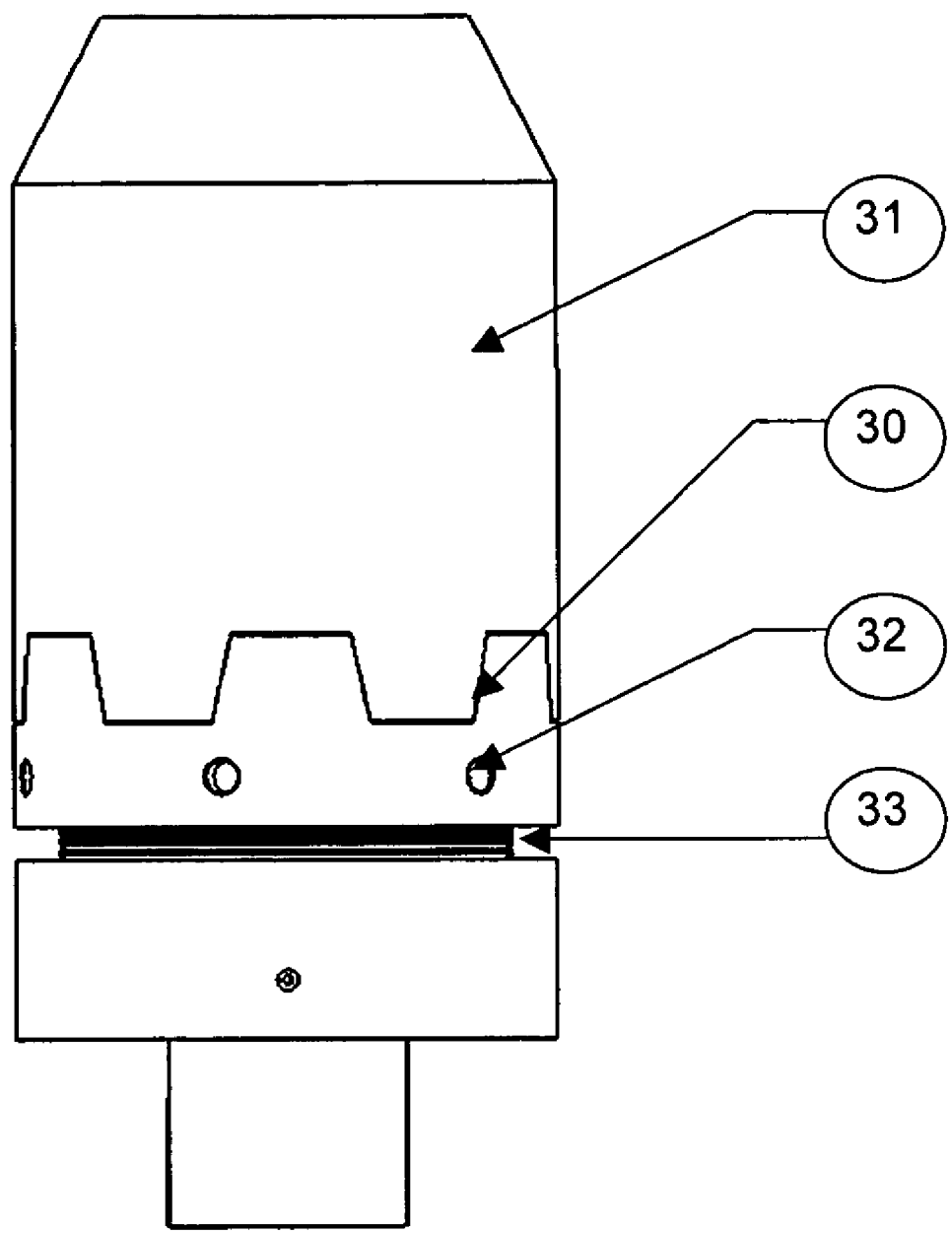
FIG. 10 is a partial side view of the unibody hydraulic nut and castellated locking collar mated to the turning socket.

With the stud bolt (20) in place as shown in FIG. 9, the underside (22) mates with the top of the inner body (10). Oil pressure is introduced through an external hydraulic connector (17) that is ported to the first hydraulic area (15). Internal porting (16) connects one hydraulic area (15) to the next in a daisy chain fashion. Hydraulic pressure from an external pump source (not shown) is now applied equally and simultaneously to each pressure area (15) (2 or more) in the unibody assembly. As pressure is applied against the hydraulic area (15), axial load is generated. This load pushes down on the outer body (11) and mating flange whilst pushing up against the inner body (10) mated to the stud bolt (20). The applied pressure preferably uniformly and simultaneously provides an axial load to each of the stud bolts (20) in this assembly (FIGS. 15 to 18). As the load is applied, the resultant forces will compress the flange assembly (40, 41) whilst stretching the stud bolts (20). The resultant movement of the inner body (10) in an axial direction of the stud bolt (20) will move the locking collar (12), which is threaded to the inner body (10), resulting in a gap (33) formed between the mating surfaces of the locking collar (12) and outer body (11) (best shown in FIGS. 8 and 9).

Figure 11:
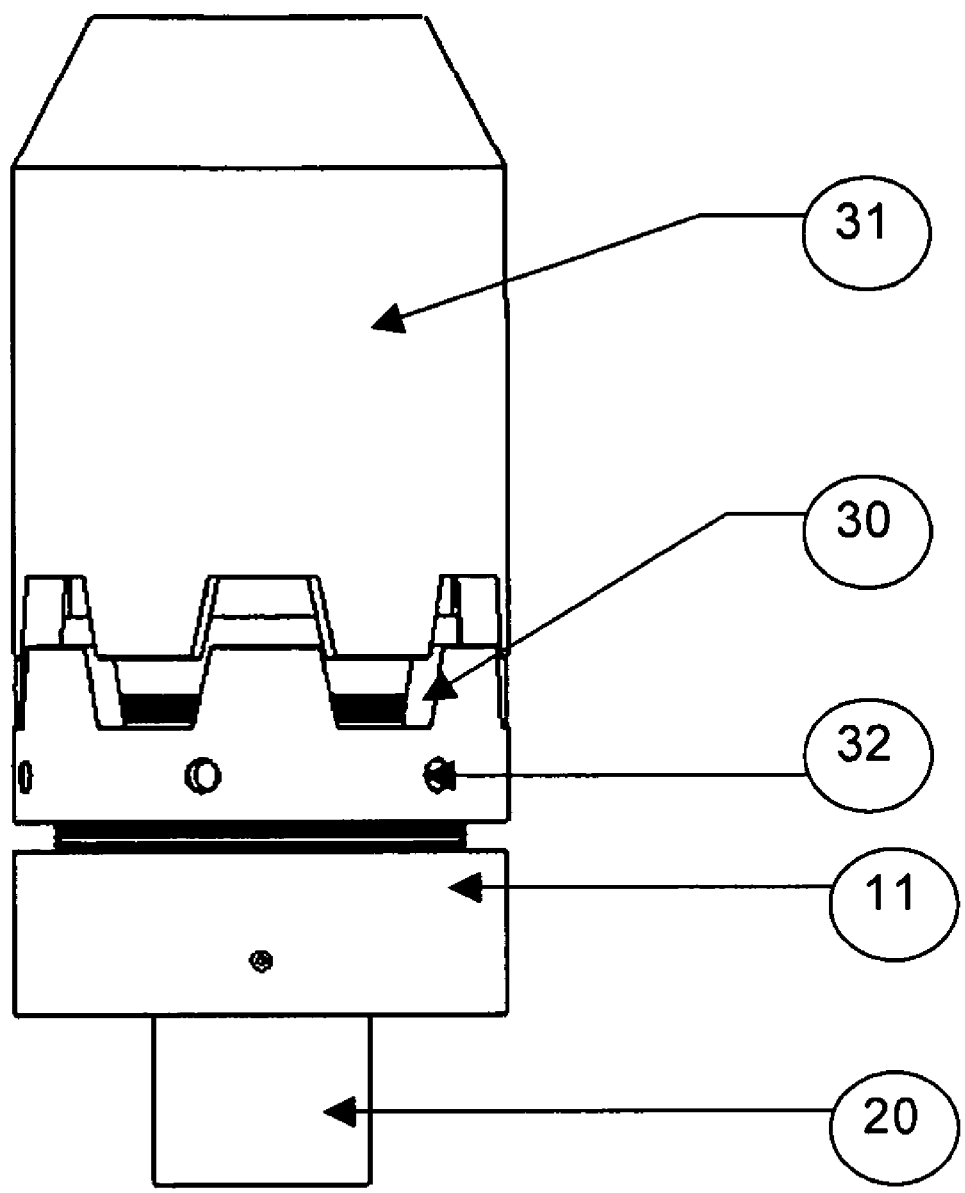
FIG. 11 is a partial side view of turning tapered castellated socket as it engages with the locking collar of the unibody hydraulic nut.
Figure 11A:
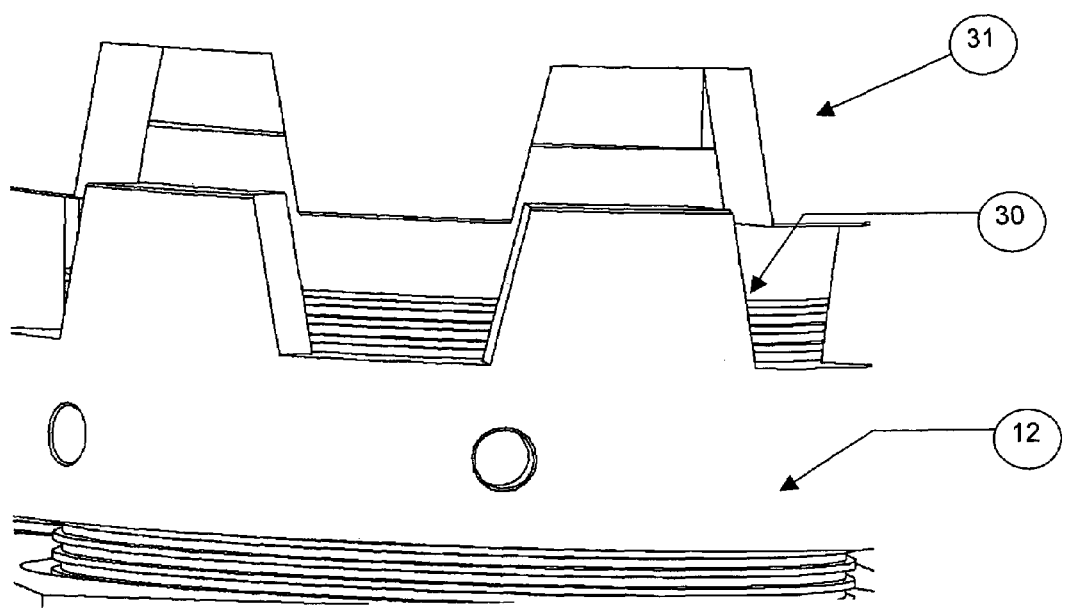
FIG. 11a is a close up of engagement of tapered castellated socket with mating locking collar.
Figure 12:
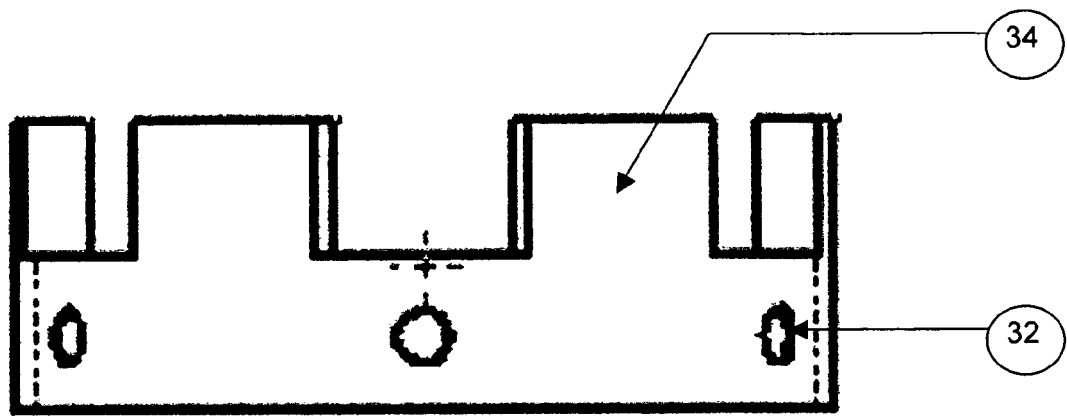
FIG. 12 is a side view of prior art of traditional castellations on a locking collar.
Figure 13:
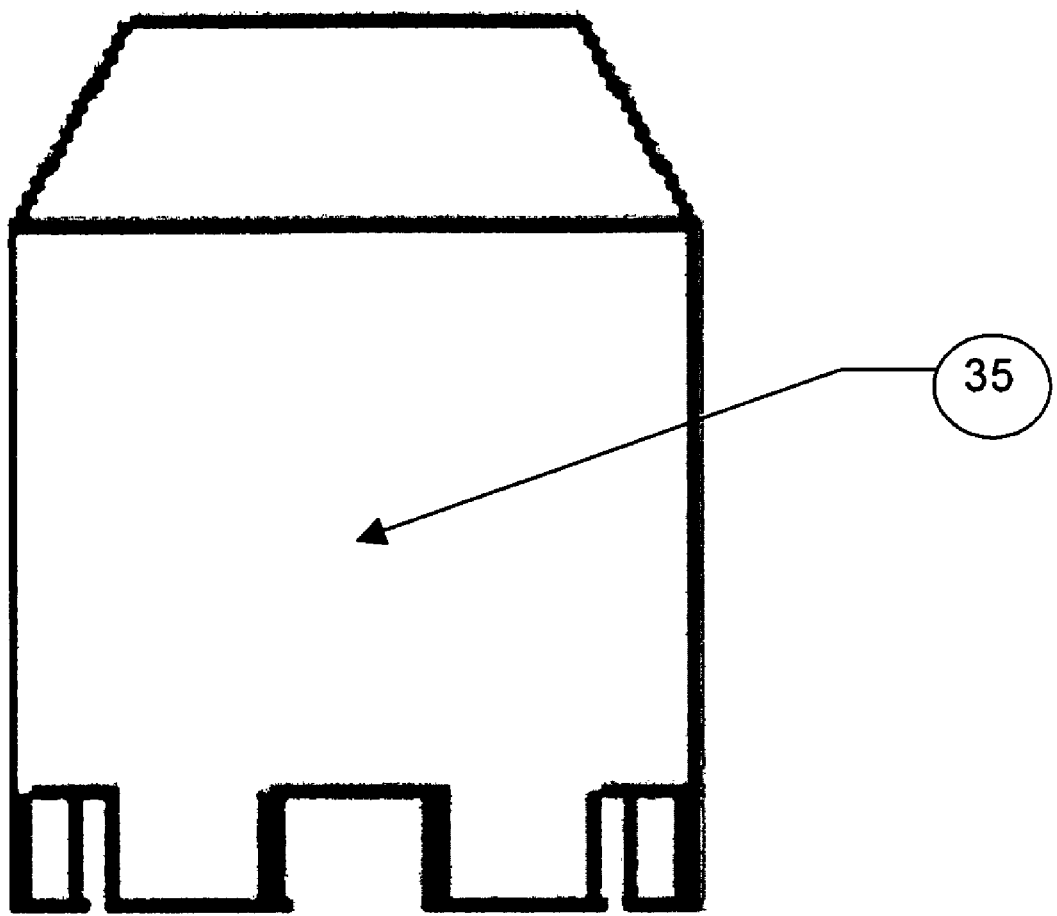
FIG. 13 is a side view of prior art of castellated turning sockets.
Figure 14:
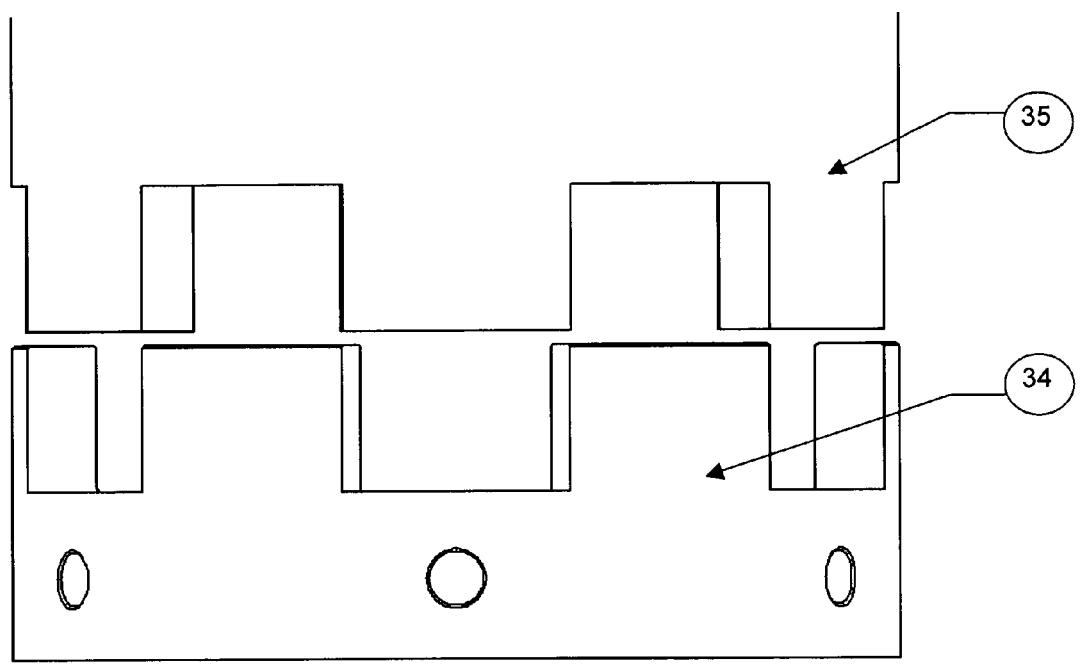
FIG. 14 is a close up side view of FIG. 13 showing engagement with prior art castellated sockets.

A castellated socket (31) is lowered over the locking collar (12) (FIG. 11), the tapered castellations (30) of the socket allowing for easy insertion (FIG. 11a) to mate the corresponding tapered castellation of the locking collar (12). Alternate turning means (FIGS. 12 to 14) such as standard castellated socket (35) or locking collar with a tommy bar hole (32) could also be employed to turn the locking collar (12) on the mating threads of the inner body (10). The locking collar is turned down the threads on the inner body (10) until it mates and abuts against the outer body (11), effectively mechanically locking the clamping axial load. This process is done for all the locking collars (12) of the unibody hydraulic nut.

It is to be understood that even though a stud (20) with an integral head has been shown, the use of other types of studs (20) and other types of mating techniques between the studs (20) and the inner bodies (10) are also contemplated. For example, the mating of the stud (20) with the inner body (10) could be effected with a normal threaded nut which is threaded down the stud until it abuts on and mates with the inner body (10). Also, the inner wall of the inner body (10) could be threaded with threads matching those of the stud (20). In that case, the transmission of the axial load from the inner body (10) to the stud (20) would be done via the threads instead of via a nut or an integral head. Therefore, the present invention is not limited to a particular mating technique between the studs (20) and the inner bodies (10).

Figure 15:
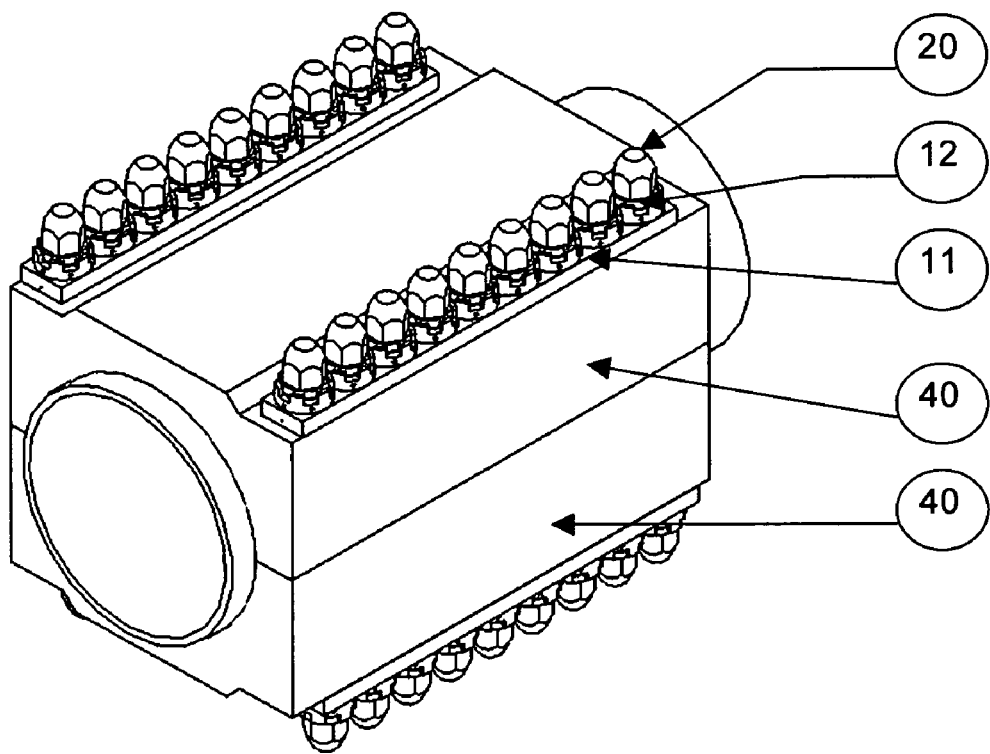
FIG. 15 is an isometric view of a typical application on unibody hydraulic nut on a completed deep water subsea pipe clamp according to the embodiment of the invention.
Figure 16:
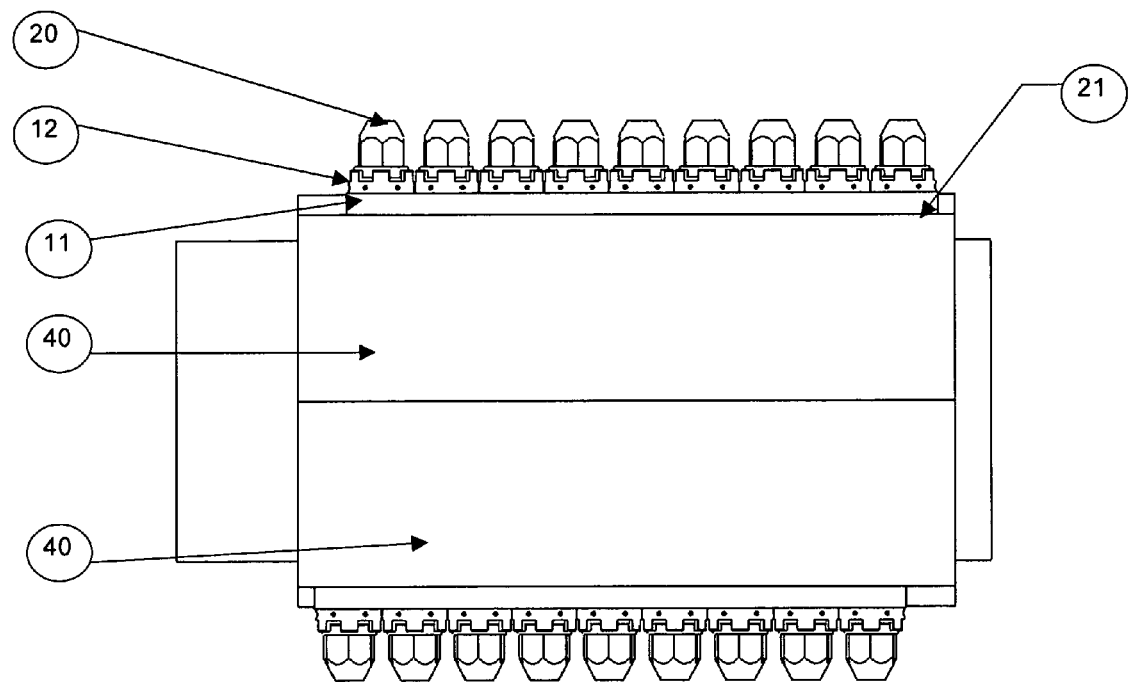
FIG. 16 is a side view of FIG. 15.

In another embodiment, the present invention is shown installed on a sub-sea clamp (FIGS. 15 and 16). The outer body (11) mates with the sub-sea clamp (40). The axial forces generated by the invention draws the mating clamps (40) together, whilst the locking collar (12) maintains the stud bolt (20) clamping load. In this embodiment, the outer body (11) is an elongated and generally straight body into which the inner bodies are preferably evenly disposed.

Figure 17:
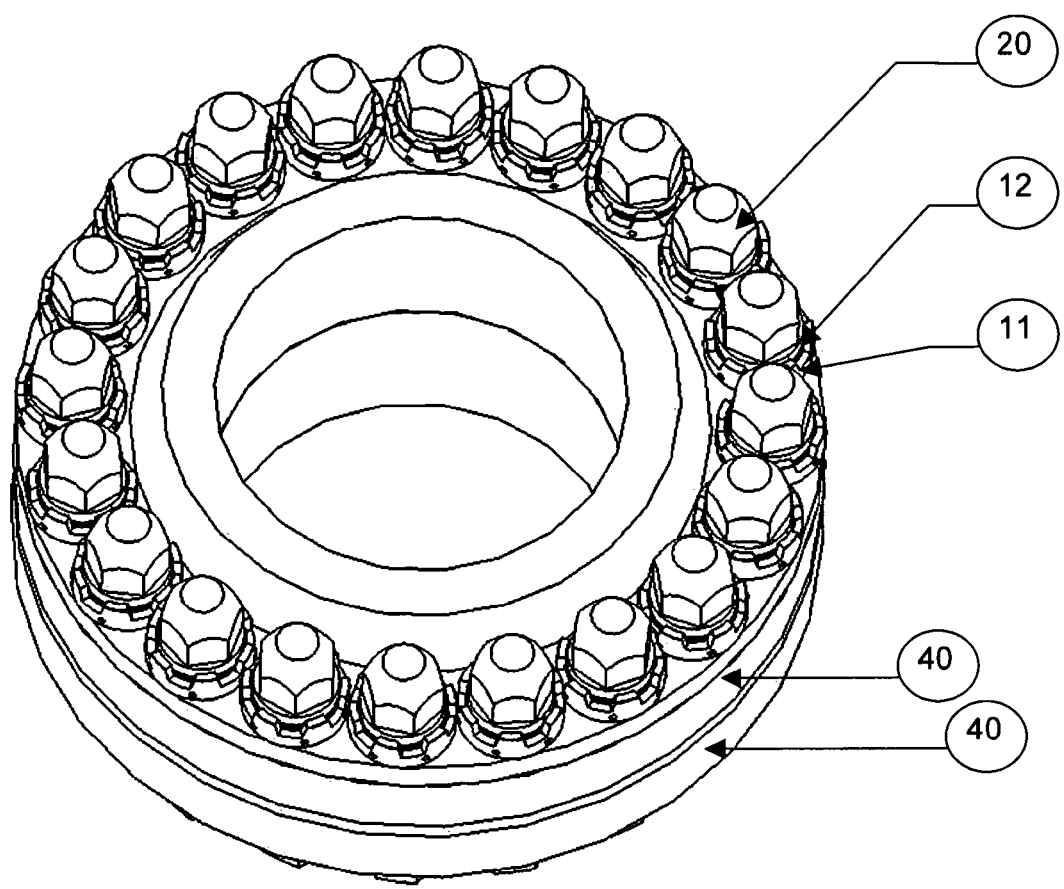
FIG. 17 is an isometric view of a typical application of unibody hydraulic nut on a completed circular flange according the embodiment of the invention.
Figure 18:
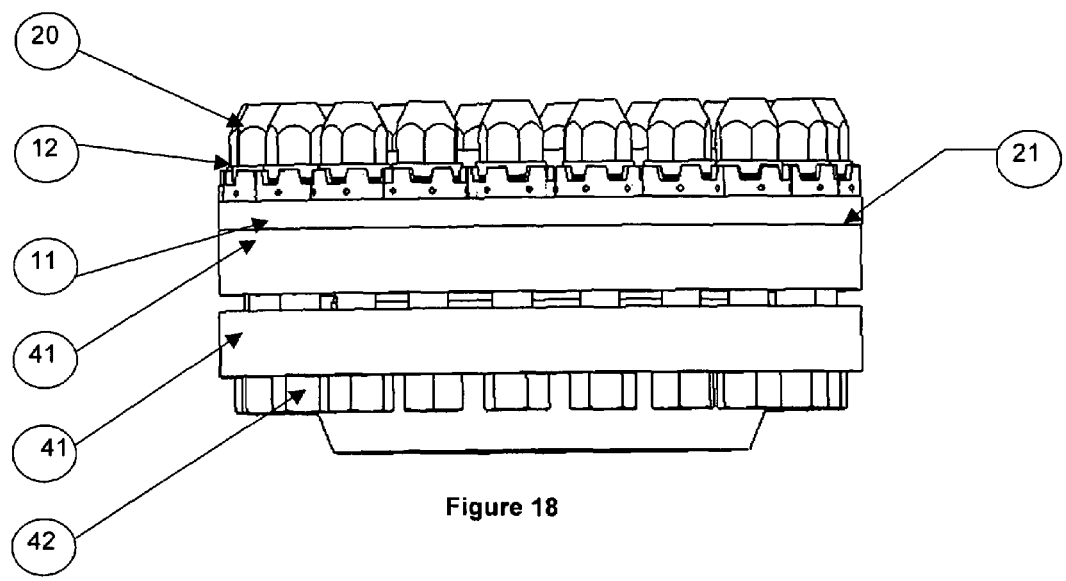
FIG. 18 is a side view of FIG. 17.

In yet another embodiment, the present invention is shown installed on the face of a circular flange (FIGS. 17 and 18). The stud bolts (20) are inserted through the inner body (10) and connecting flanges (41) for threading on or attaching to mechanical locking means, in this case, mating nuts (42), on the opposite flange face. Different mechanical locking means could also be contemplated such as locking pin or even hydraulic nuts.

As shown in FIGS. 17 and 18, in this embodiment, the outer body (11) has the shape of a generally circular ring and the inner bodies (10) are preferably evenly disposed along the outer body (11).

Figure 2:
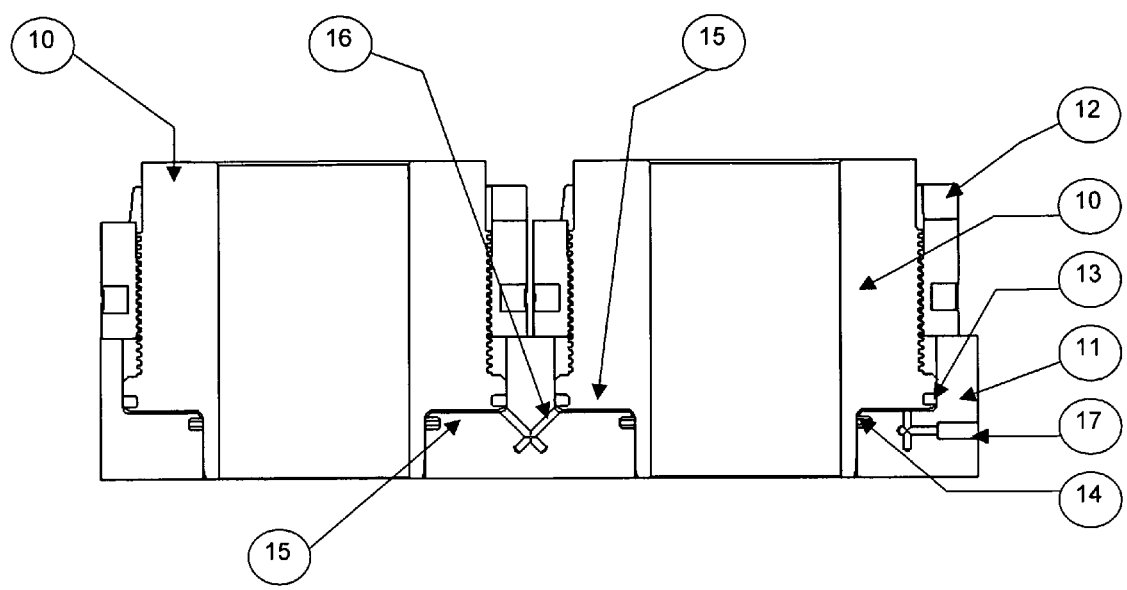
FIG. 2 is a full section of FIG. 1 view showing internal porting and external porting of the unibody hydraulic nut assembly.
Figure 3:
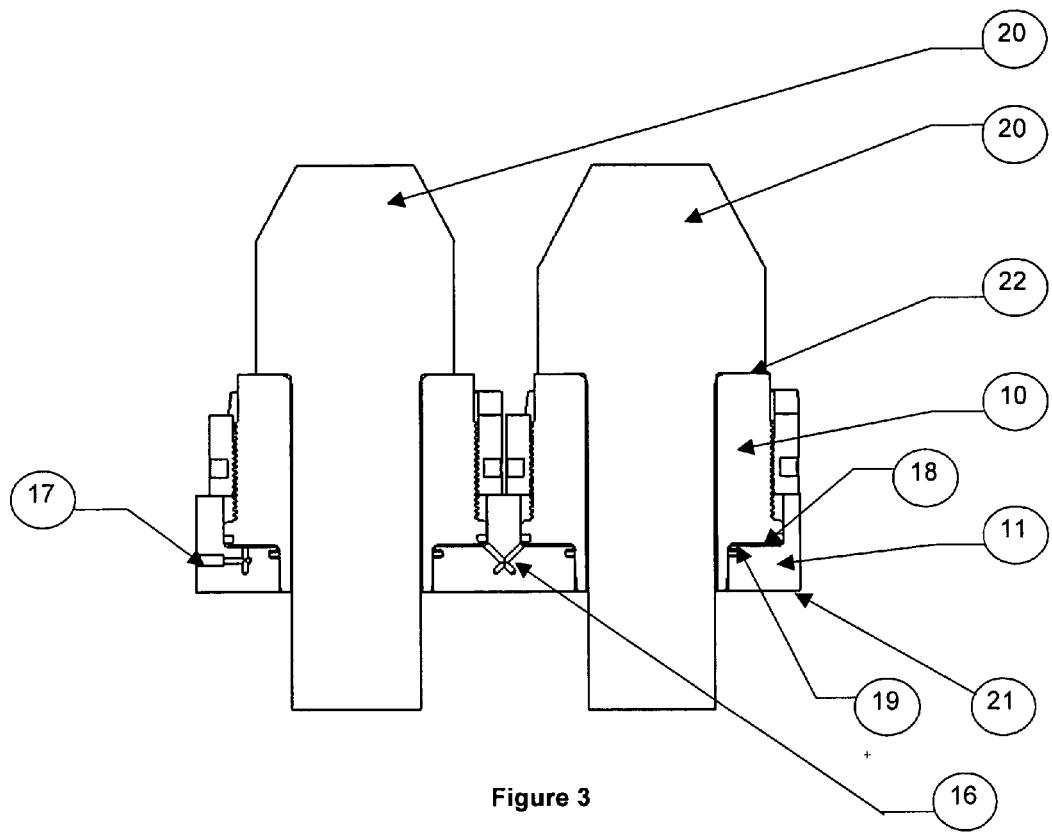
FIG. 3 is a partial section detail view showing the unibody hydraulic nut with headed bolt installed.
Figure 4:
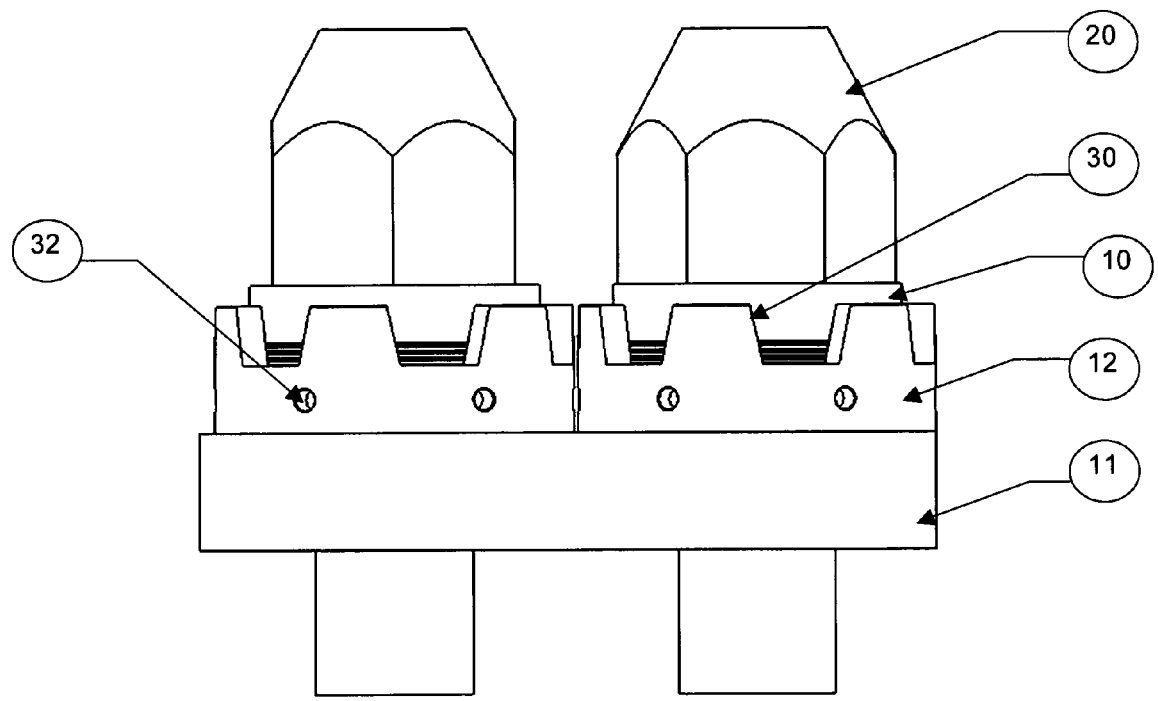
FIG. 4 is a partial side view of unibody hydraulic nut with headed bolt mated against unibody hydraulic nut.
Figure 5:
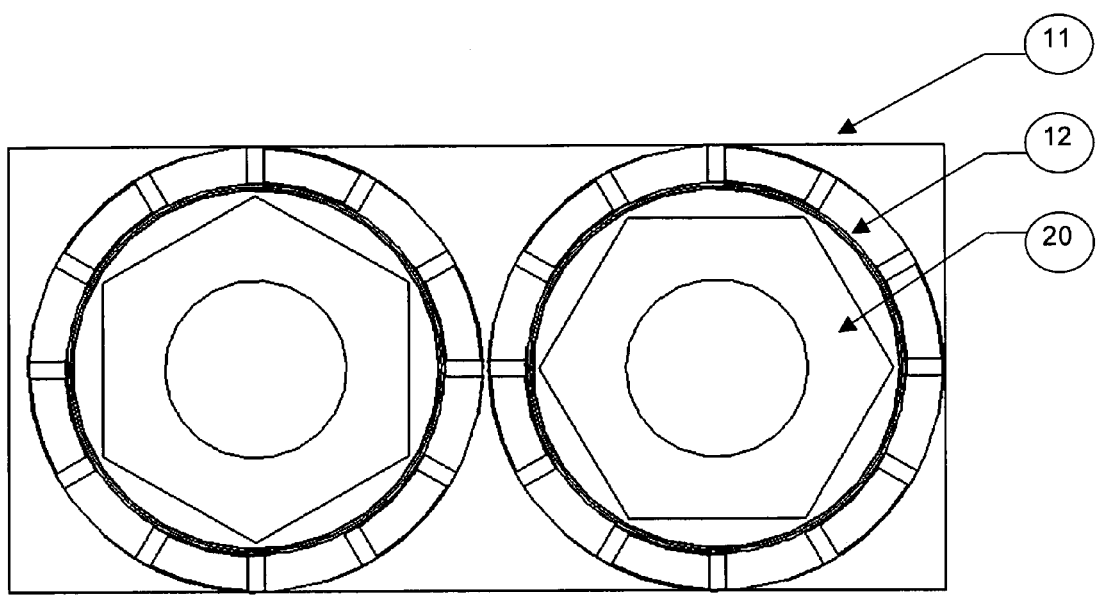
FIG. 5 is a partial top view of unibody hydraulic nut with headed bolt installed.
Figure 6:
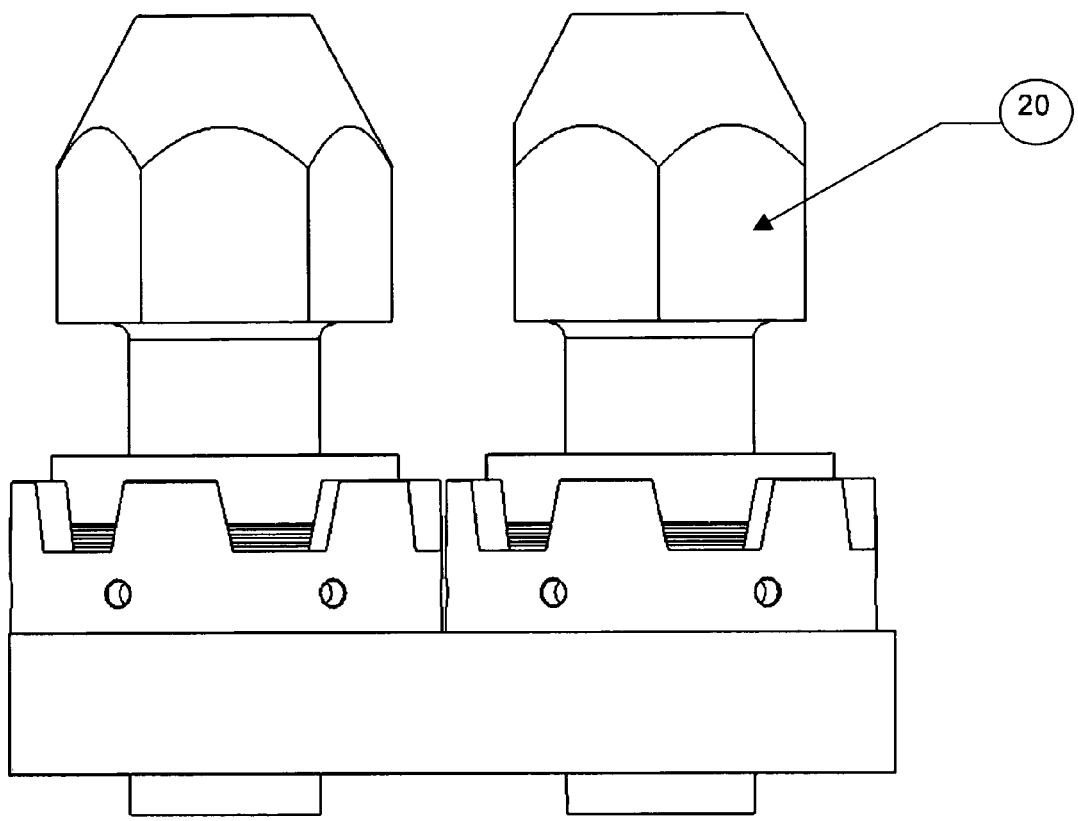
FIG. 6 is a side view of unibody hydraulic nut showing installation of headed bolt by turning of a traditional socket against the mating hex.
Figure 19:
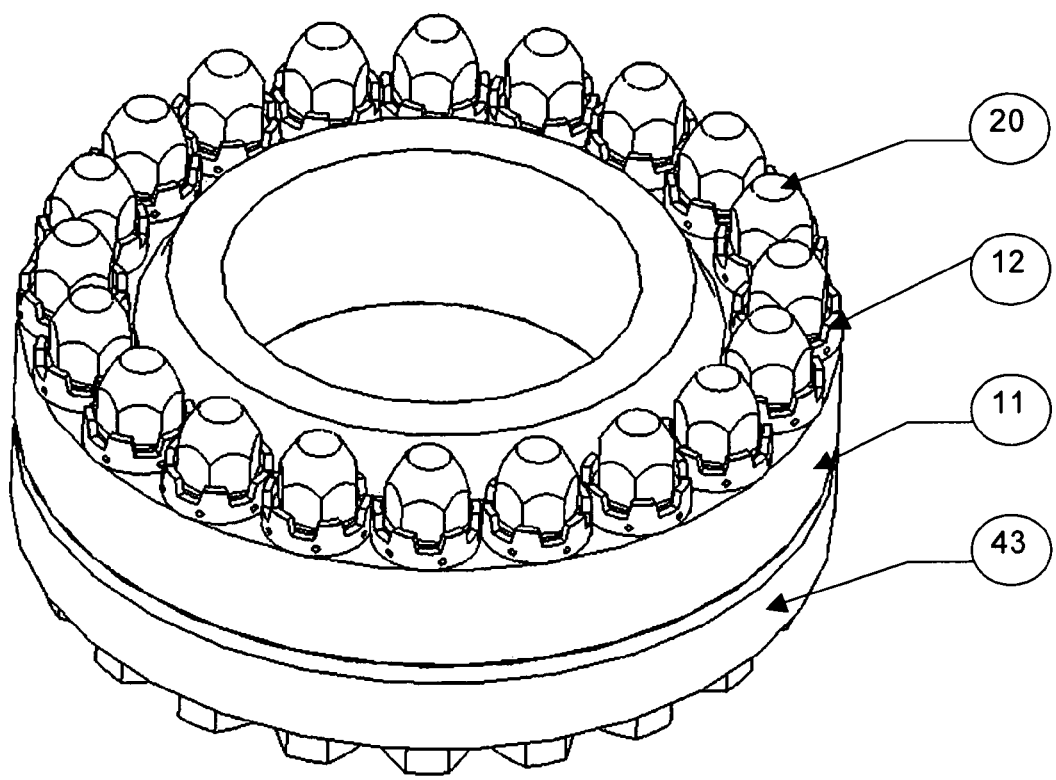
FIG. 19 is an isometric view of a typical application of a unibody hydraulic nut where the flange is the unibody according to the embodiment of the invention.
Figure 20:
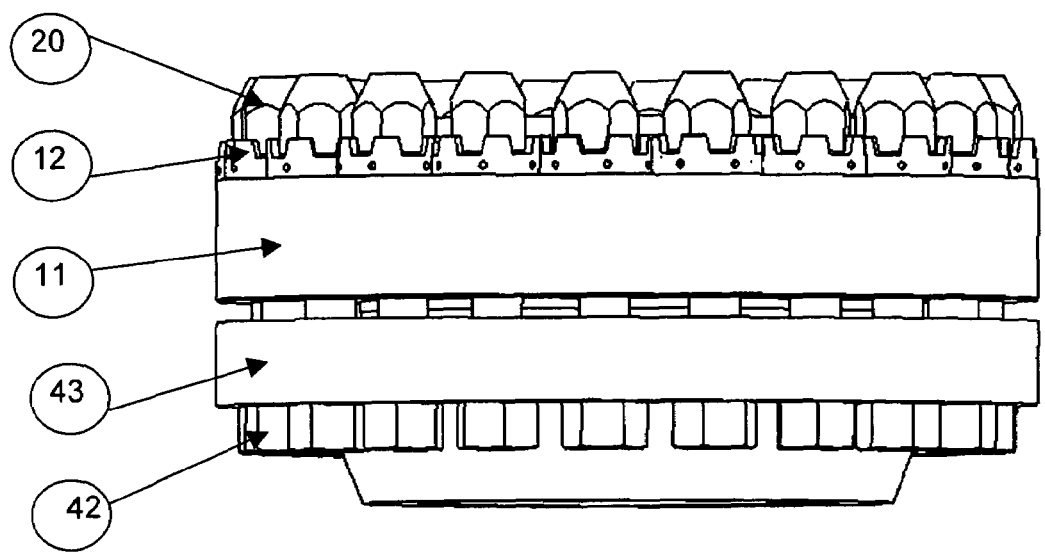
FIG. 20 is a side view of FIG. 19.

In a variant of the embodiment of FIGS. 17 and 18 shown in FIGS. 19 and 20, the flange (41) and the outer body (11) form a single outer body/flange component. In fact, the outer body (11) has been directly machined and integrated into the flange (41) to create a single physical component (11). Thus, the flange body is machined and internally ported in a similar way as for an external outer body (FIG. 2). The inner bodies (10) are mated to the flange/outer body (11) in a similar fashion. Stud bolts (20) are inserted through the inner body, flange/outer body (11) and through the outer body of the mating flange (43) threading into corresponding nuts (42).

Obviously, even if only two shapes of unibody hydraulic nut have been shown and described, the skilled addressee will understand that the outer body (11) of the present invention could be provided in a variety of shapes and sizes according to the specific needs of a specific flanges assembly.

Thus, although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. A hydraulic nut for tensioning an assembly comprising multiple studs, said hydraulic nut comprising:

a. an outer body having formed therein a plurality of substantially cylindrical bores, each of said bores defining an annular shoulder;

b. a plurality of substantially annular inner bodies, each of said inner bodies being respectively slidingly received into one of said bores of said outer body for relative movements with respect to said outer body, each of said inner bodies defining an annular shoulder such that said annular shoulders of said bores and said annular shoulders of said inner bodies define annular pressure areas therebetween, each of said inner bodies having an outer surface provided with outer threads, and each of said inner bodies being configured to engage one of said studs;
c. a plurality of locking collars respectively mounted to said inner bodies for relative movements with respect to said inner bodies, each of said locking collars having an inner surface provided with inner threads, said inner threads of said locking collars respectively engaging said outer threads of said inner bodies;
d. internal hydraulic ports extending within said outer body between adjacent bores, said internal hydraulic ports fluidly connecting adjacent pressure areas together;
e. at least one external hydraulic pressure port extending through said outer body between at least one of said bores and the exterior of said outer body;
wherein when hydraulic fluid is pumped through said external hydraulic pressure port, said hydraulic fluid flows to each of said pressure areas via said internal hydraulic ports whereby pressurization of each of said pressure areas is effected substantially simultaneously.

2. A hydraulic nut as claimed in claim 1, wherein at least one of said plurality of locking collars comprises a first portion and a second portion, said second portion comprising a plurality of upwardly projecting protuberances, each two consecutive protuberances being separated by a recess, said protuberances being tapered toward the top.

3. A hydraulic nut as claimed in claim 1, wherein said outer body is an elongated structure.

4. A hydraulic nut as claimed in claim 1, wherein said outer body is a curved structure.

5. A hydraulic nut as claimed in claim 4, wherein said outer body is an endless curved structure.

6. A hydraulic nut as claimed in claim 1, wherein said assembly comprises at least one flange and wherein said outer body and said flange are unitary.

7. A hydraulic nut as claimed in claim 1, wherein at least one of said inner bodies further comprises an annular groove located adjacent to said annular shoulder of said at least one of said inner bodies, and wherein a seal is located in said annular groove.

8. A hydraulic nut as claimed in claim 1, wherein each of said inner bodies further comprises an annular groove, each of said annular grooves being located adjacent to said respective annular shoulders of said inner bodies, and wherein seals are respectively located in each of said annular grooves.

9. A hydraulic nut as claimed in claim 1, wherein at least one of said bores of said outer body further comprises an annular groove located adjacent to said shoulder of said at least one of said bores, and wherein a seal is located in said annular groove.

10. A hydraulic nut as claimed in claim 1, wherein each of said bores of said outer body further comprises an annular groove, each of said annular grooves being located adjacent to said respective shoulders of said bores, and wherein seals are respectively located in each of said annular grooves.

11. A hydraulic nut as claimed in claim 1, wherein each of said locking collars comprises a first portion and a second portion, said second portion comprising a plurality of upwardly projecting protuberances, each two consecutive protuberances being separated by a recess, said protuberances being tapered toward the top.

12. A hydraulic nut as claimed in claim 1, wherein at least one of said plurality of locking collars comprises a lower portion and an upper portion, said upper portion being castellated.

13. A hydraulic nut as claimed in claim 1, wherein each of said locking collars comprises a lower portion and an upper portion, said upper portion being castellated.

14. A hydraulic nut for tensioning an assembly, said hydraulic nut comprising:
a. an outer body;
b. a plurality of inner bodies being slidingly mounted into said outer body, each of said plurality of inner bodies defining an annular pressure area between said inner bodies and said outer body, and each of said plurality of inner bodies being configured to receive and mate with a stud;
c. a plurality of locking collars moveably and respectively mounted onto each of said inner bodies wherein said plurality of inner bodies and plurality of locking collars are each threaded with the said plurality of inner bodies outer surface having said threads engaging inner threads of said plurality of locking collars;
d. internal hydraulic ports extending within said outer body between adjacent pressure areas and fluidly connecting said adjacent pressure areas together;
e. an external hydraulic pressure port extending through said outer body to at least one of said pressure areas;
wherein when hydraulic fluid is pumped through said external hydraulic pressure port, said hydraulic fluid flows to each of said pressure areas via said internal hydraulic ports whereby pressurization of each of said pressure areas is effected substantially simultaneously.

15. A hydraulic nut for tensioning an assembly comprising multiple studs, said hydraulic nut comprising:
a. an outer body comprising a plurality of bores wherein adjacent bores are respectively separated by wall portions;
b. a plurality of inner bodies slidingly mounted in piston arrangements into said bores of said outer body such that each of said wall portions is shared to two of said inner bodies, each of said inner bodies respectively defining an annular pressure area with one of said bores of said outer body, each of said inner bodies having an outer surface comprising outer threads, and each of said plurality of inner bodies being configured to engage one of said studs;
c. a plurality of locking collars moveably and respectively mounted onto each of said inner bodies, each of said locking collars having an inner surface provided with inner threads, said inner threads of said locking collars respectively engaging said outer threads of said inner bodies;
d. internal hydraulic ports extending within said outer body between adjacent pressure areas and fluidly connecting said adjacent pressure areas together;
e. an external hydraulic pressure port extending through said outer body to at least one of said pressure areas;
wherein when hydraulic fluid is pumped through said external hydraulic pressure port, said hydraulic fluid flows to each of said pressure areas via said internal hydraulic ports whereby pressurization of each of said pressure areas is effected substantially simultaneously.

16. A hydraulic nut assembly as claimed in claim 15, wherein an extremity of at least one of said locking collars defines alternating protuberances and recesses.

17. A hydraulic nut assembly as claimed in claim 15, wherein an extremity of each of said locking collars defines alternating protuberances and recesses.

* * * * *